United States Patent
Grigorieva et al.

[11] Patent Number: 5,712,060
[45] Date of Patent: Jan. 27, 1998

[54] ALKALINE STORAGE CELL

[75] Inventors: Ljudmila Konstantinovna Grigorieva; Vladimir Nikolaevich Medvedkov, both of Moscow; Alexandr Petrovich Pavlov, Moskovskaya; Vladimir Andreevich Soldatenko, Moscow; Vitaly Khristoforovich Stankov, Moscow; Semen Petrovich Chizhik, Moscow, all of Russian Federation

[73] Assignee: Aktsionernoe Obschestvo Zakrytogo Tipa "Avtouaz", Moscow, Russian Federation

[21] Appl. No.: 624,641

[22] PCT Filed: Nov. 28, 1994

[86] PCT No.: PCT/RU94/00264

§ 371 Date: Apr. 8, 1996

§ 102(e) Date: Apr. 8, 1996

[87] PCT Pub. No.: WO96/05627

PCT Pub. Date: Feb. 22, 1996

[30] Foreign Application Priority Data

Aug. 9, 1994 [RU] Russian Federation ........... 94028153

[51] Int. Cl.[6] .................... H01M 10/24; H01M 2/16
[52] U.S. Cl. .................... 429/206; 429/247; 429/248
[58] Field of Search .................... 429/144, 145, 429/206, 247, 248

[56] References Cited

U.S. PATENT DOCUMENTS

| | | | |
|---|---|---|---|
| 1,496,294 | 6/1924 | Brown. | |
| 3,920,478 | 11/1975 | Kozawa | 136/111 |
| 3,957,534 | 5/1976 | Linkohr et al. | 136/86 D |
| 4,015,055 | 3/1977 | Langan et al. | 429/145 |
| 4,157,423 | 6/1979 | Gadesaaud | 429/206 |
| 4,298,666 | 11/1981 | Taskier | 429/206 |
| 4,378,414 | 3/1983 | Furukawa et al. | 429/144 |
| 5,532,087 | 7/1996 | Nerz et al. | 429/248 |

FOREIGN PATENT DOCUMENTS

| | | |
|---|---|---|
| 1485539 | 5/1967 | France. |
| 1485539 | 6/1967 | France. |
| 2144935 | 2/1973 | France. |
| 2191289 | 2/1974 | France. |
| 2326049 | 4/1977 | France. |
| 1 496 294 | 6/1970 | Germany. |
| 62-35464 | of 1987 | Japan. |

OTHER PUBLICATIONS

M. Maksimovic, P. Rakin, D. Keca, K. Popov and M. Vojnovic "Nickel–zinc battery with a soluble negative electrode and the auxiliary electrode"; Hemijska Industrija. Journal of Federation of Chemists and Technologists of Yugoslavia, Beograd, No. 2, Feb. 1976, pp. 57–60.

V.S. Bagotskii, A.M. Skundin "Chemical Power Supply"; Moscow Energoizdat 1981. (Month n/a).

Hemijska industrija, vol. 30, No. 2, opubl. 1976 (izd. Stampa, Beograd) M. Maksimovic, "Nikl cink akumulator sa rastvornom negativnom elektrodom i pomocnom elektrodom", pp. 57–60 (Month n/a).

V.S. Bagotsky, A.M. Skundin—Chemical Electric Current Sources, Moscow, Energoizdat Publishers, 1981, pp. 171–178, 192–195. (Month n/a).

Primary Examiner—John S. Maples
Attorney, Agent, or Firm—Pennie & Edmonds LLP

[57] ABSTRACT

This invention relates to electrical engineering and may be used for the production of alkaline storage cells based on various electrochemical systems. The alkaline storage cell comprises a casing filled with electrolyte and accomodating positive 1 and negative 2 electrodes separated by a multilayer separator consisting of layers 3, 4. The casing also comprises a porous metallic foil 5 interposed between the electrodes 1, 2. The foil 5 is inserted between the separator layers 3, 4 and may adjoin one of electrodes 1, 2. The porous foil 5 has a thickness of 50–200 μm, a porosity of 30–60%, and a pore size of 1–20 μm. The porous foil 5 may be made of nickel. The alkaline storage cell features enhanced reliability and stable discharge characteristics.

6 Claims, 2 Drawing Sheets

ALKALINE STORAGE CELL

FIELD OF THE INVENTION

The present invention relates to electrical engineering and may be used for the production of alkaline storage cells based on various electrochemical systems, such as nickel-zinc, nickel-cadmium, nickel-iron, silver-zinc, silver-cadmium, etc.

BACKGROUND ART

Alkaline storage cells may be regarded as highly promising self-contained power supply sources. They were developed as an alternative to lead storage cells which have poor specific electric parameters, inadequately short service life, and require servicing during intermittent operation. Alkaline cells do not have these drawbacks and, in principle, may have a service life of from 10 to 15 years, which is equivalent to up to 4000 and more working cycles (Ref. V. S. Bagetsky, A.M. Skukdin—Chemical Electric Current Sources, Moscow, Energoizdat Publisher, 1981, pp. 171–176, 192–195).

However, the following adverse phenomena prevent the potentialitis of alkaline storage cells from being realized:

the formation of dendrites, resulting in short circuiting of the electrodes and, ultimately, failure of the cell;

oxygen release at the positive electrode followed by its migration to the negative electrode, thereby reducing cell capacity;

transfer of mass from one electrode to the other; and swelling of electrodes as the number of cycles increases, thereby leading to peeling-off and crumbling of the active mass.

Various steps are taken to overcome these adverse phenomena, such as, making use of multilayer composite cell separators, making the negative electrode capacity superfluous, closely packing the electrodes during assembly, using swelling cell separators, and using different electrode structures, such as lamellar, pressed, coated, metal-ceramic, etc.

Known in the prior art is an alkaline storage cell comprising a casing, electrolyte, a negative zinc electrode, a positive electrode, and a separator interposed between the electrodes (F.R.G. Pat. No. 1,496,294; Cl. H 0I M Mar. 4, 1971. In order to slow down the growth of dendrites, which lead to short circuiting of the electrodes, this cell employs a separator that has a smooth surface facing its negative electrode and grooves on the surface facing its positive electrode. The oxygen released at the positive electrode during charging diffuses through pores in the separator to the negative electrode, where it oxidizes the zinc dendrites.

It is the superfluous capacity of the zinc electrode, in that cell which causes deterioration of its specific characteristics. Moreover, to prevent overcharge of the zinc electrode and to avoid dendrite growth, it is necessary to periodically discharge the cell practically to zero.

Also known in the prior art is an alkaline storage cell comprising a casing, filled with an alkaline electrode solution, a positive electrode, and a negative zinc electrode, the electrodes being separated by a multilayer separator (U.S. Pat. No. 4,378,414; ClH OI M Oct. 24, 1983). Provision for a multilayer separator makes it possible to increase the useful life of the cell by providing the latter with mechanical protection against short circuiting. However, a drawback of the known cell is the limitation of its useful life due to short circuiting of the electrodes as a result of the destruction of separator and subsequent growth of dendrites through the separator. Besides, the oxygen released at the positive electrode diffuses to the negative electrode to cause its passivation through oxidation.

Also known in the prior art is an alkaline storage cell comprising a casing, an alkaline electrolyte solution, a positive electrode and a negative zinc electrode. The electrodes are separated by a multilayer separator comprising a membrane which is permeable to the electrolyte, but impermeable to the ions leaving the negative electrode and to the gaseous oxygen released at the positive electrode (U.S. Pat. No. 4,157,423, Cl. H OI M Feb. 14, 1979). The presence of the aforesaid membrane in the cell separator prevents the transfer of mass from the negative to the positive electrode, and the diffusion-mediated transfer of oxygen to the negative electrode. Nevertheless, the formation of dendrites and the short circuiting of the electrodes in this cell also shorten its useful life.

DISCLOSURE OF THE INVENTION

The object of the present invention is to develop an alkaline storage cell featuring prolonged service life and high specific electrical characteristics.

The above-formulated object is attained owing to the fact that an alkaline storage cell comprising a casing, electrolyte, a positive electrode, a negative electrode, and a multilayer separator interposed between the electrodes, additionally, comprises, in accordance with the present invention, a porous metallic foil interposed between the electrodes.

It is possible that this porous metallic foil be placed between the separator layers, thereby providing mechanical and electrochemical protection for the electrodes and thus eliminating the possibility of their short circuiting. Growing dendrites are unable to pierce the fine-porous metallic foil. In addition, when zinc dendrites come in contact with nickel, the electrochemical dissolution of zinc takes place. The fine-porous foil hampers the transfer of zincate ions to the positive electrode and the diffusion of oxygen to the negative electrode, which otherwise would cause oxidation and passivation.

It is possible that the metallic foil would be adjacent to one of the electrodes. This is particularly necessary where coated or pressed electrodes are used in cells, since the active material of such electrodes when the number of working cycles increases, becomes swollen, peels-off, and crumbles. Positioning the porous foil near the electrode prevents the active material from crumbling, because functionally the foil will play the part of a lamella. Moreover, since the foil is impregnated with electrolyte and is impermeable to oxygen, it prevents the passivation of the negative electrode and makes the need for it to be made with a capacity that is superfluous in relation to that of the positive electrode, unnecessary.

It is possible that the porous metallic foil would have a thickness of from 50 to 200 µm, porosity of from 30 to 60%, and a pore size of from 1 to 20 µm. Technically, it is difficult to manufacture a porous foil having a thickness of less than 50 µm and such a foil has insufficient mechanical strength. It is unadvisable to employ a foil with a thickness in excess of 200 µm, since a further increase in the thickness would not result in an increase in the cell's useful service life, but, at the same time, would worsen the specific electrical characteristics of the cell by increasing its weight and overall dimensions.

The ranges of porosity and pore diameters of the metallic foil are determined by the internal electrical resistance of the cell, by the reliability of the mechanical protection against short circuiting, and by its gas insulating (gas proof) properties.

The minimum pore size and porosity of a metallic foil are determined by the permissible internal resistance of a cell. At a porosity of below 30% and a pore size of less than 1 μm, the foil will have a shielding effect on the electrodes and will impede electric current flow, thereby increasing the cell's internal resistance, which worsens its electrical characteristics.

A foil with a porosity of more than 60% has insufficient mechanical strength, while if the pores have a size of more than 20 μm, dendrites may grow through them. Moreover, a foil with large pores does not constitute a barrier against the transfer of anodic ions, such as, e.g. zincate ions, to the cathode. The transfer of ions and their subsequent deposition on the cathode impair the characteristics of the cathode.

It is advisable that the porous metallic foil be fabricated of nickel, since the latter is stable under the operating conditions of the cell and is commonly used in the production of alkaline storage cells. Moreover, a method for manufacturing porous nickel foil having predetermined parameters does exist and is currently used on an industrial scale.

BRIEF DESCRIPTION OF THE DRAWINGS

The present invention will now be explained with the help of its specific embodiments and with reference to the accompanying drawings, wherein:

As shown in FIG. 1, an alkaline storage cell comprises a plurality of positive electrodes 1, a plurality of negative electrodes 2, and a multilayer separator consisting of layers 3 adjoining the positive electrodes 1, and layers 4 adjoining the negative electrodes 2. Layers of porous metallic foil 5 are placed between the layers 3 and 4 of the multilayer separator. The positive electrodes 1 are combined to form a single assembly and are provided with a terminal 6. The negative electrodes 2 are also combined to form an assembly provided with a terminal 7.

Figure 2:
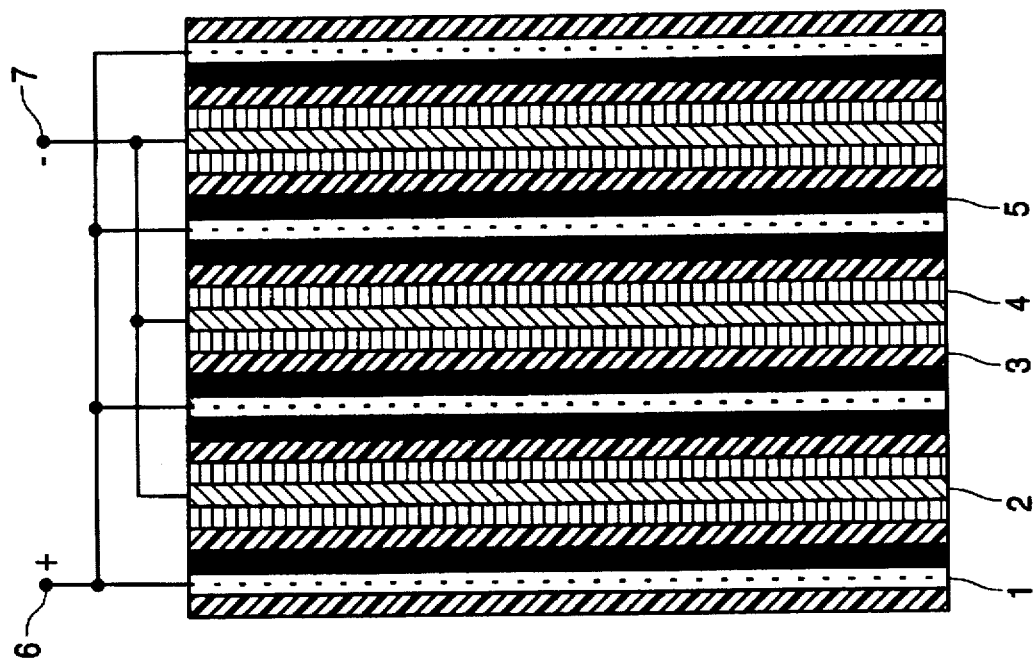
FIG. 2 is a schematic view of an electrode assembly in an alkaline storage cell realized in accordance with the present invention, with the porous foil placed adjacent to the positive electrodes.
Figure 1:
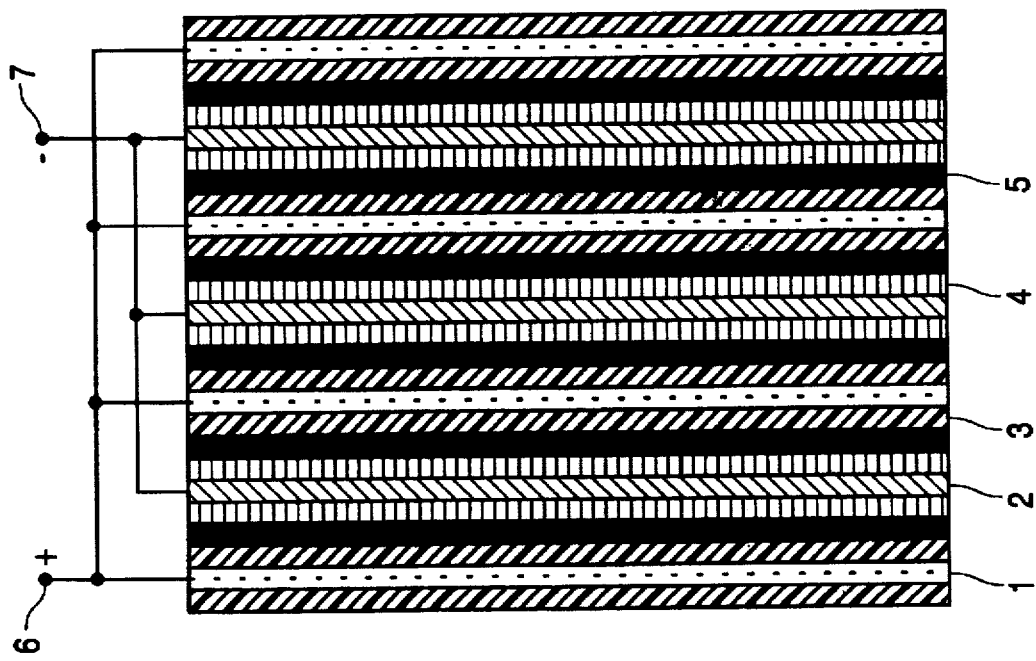
FIG. 1 is a schematic view of an electrode assembly in an alkaline storage cell realized in accordance with the present invention, with porous foil disposed between the separator layers.
Figure 3:
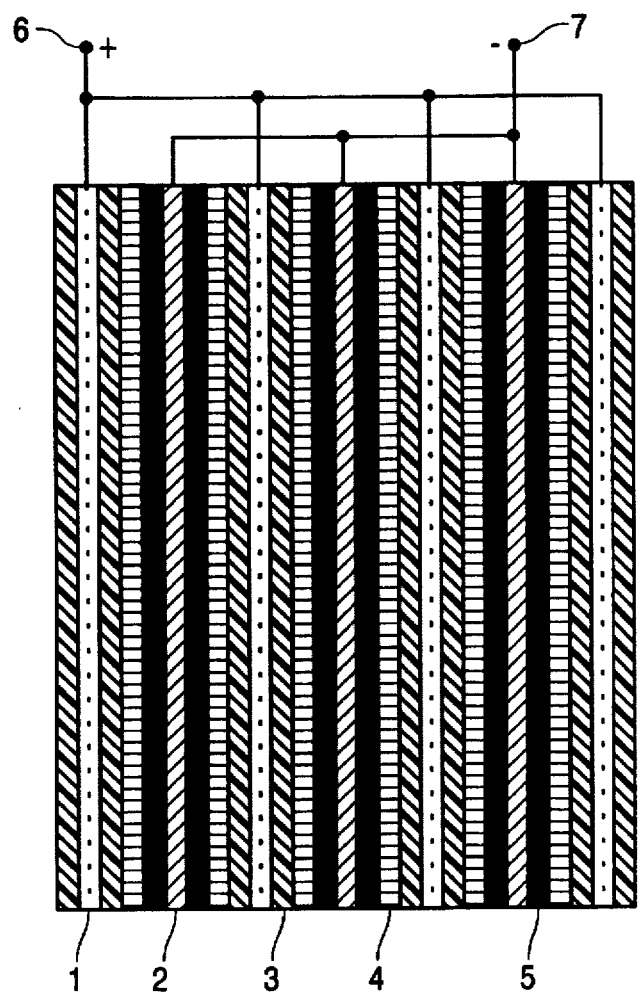
FIG. 3 is a schematic view of an electrode assembly in an alkaline storage cell made in accordance with the present invention, with the porous foil placed adjacent to the negative electrodes.

The electrode assemblies of the alkaline storage cell schematically shown in FIGS. 2 and 3 are different from the embodiment shown with reference to FIG. 1 only in where the porous metallic foil 5 layers are positioned. Thus, in accordance with the embodiment of FIG. 2, the porous metallic foil 5 layers adjoin the positive electrodes 1, whereas in the embodiment of FIG. 3 the porous metallic foil 5 layers adjoin the negative electrodes.

The alkaline storage cell in accordance with the present invention operates as follows, irrespective of the specific disposition of the porous metallic foil 5 layers:

During cell discharge, metal at its negative electrode 2, usually made of cadmium, or zinc, or iron, oxidizes. This oxidation process proceeds in accordance with Equation (1):

(1)

When discharging occurs, the positive electrode I, usually made of nickel hydroxide (NiOOH), is reduced to nickelous hydroxide Ni(OH)$_2$. The process takes place in accordance with Equation (2):

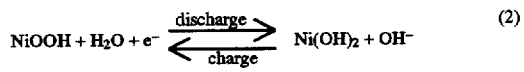
(2)

The resultant current-generating reaction in an alkaline storage cell is described by Equation (3):

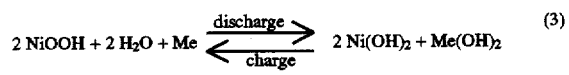
(3)

When an alkaline storage cell is being charged, the above-described processes proceed in the reverse direction (see Equations /1/–/3/, the direction of the charge and discharge reactions being shown by arrows).

The porous layers 3, 4 of the separator and the foil 5 are impregnated with an alkaline electrolyte solution and do not impede the current flow due to ion transfer. The purpose of separator layers 3, 4 is to prevent short circuiting of the electrodes 1, 2 and, associated therewith, failure of the cell. The porous foil 5, without hindering the charge and discharge processes, enchances the service life and reliability of an alkaline cell.

The present invention will now be explained with examples of some of its practical embodiments:

EXAMPLE 1

A cell was assembled on the basis of a nickel-zinc storage cell having a capacity of 30 ampere-hours, in which, in accordance with the present invention, a porous nickel foil having a thickness of 70 μm, a porosity of 40%, and an average pore size of 5 μm, was placed between the electrodes. In order to do this, the electrode assemblies were withdrawn from the cell casing, the aforesaid foil was interposed between the layers of a polypropylene separator, after which the electrode assemblies with the foil were reinstalled in the cell casing. The cell was filled with a standard-type electrolyte and subjected to cycling tests, during which the cell was charged with a 6-ampere current to a voltage of 2.0 V, the cell discharged was also effected with a 6-ampere current down to a final voltage of 1.65 V. Control discharge cycles were periodically effected down to a final voltage of 1.0 V. All in all, the cell was subjected to more than 100 cycles.

Figure 4:
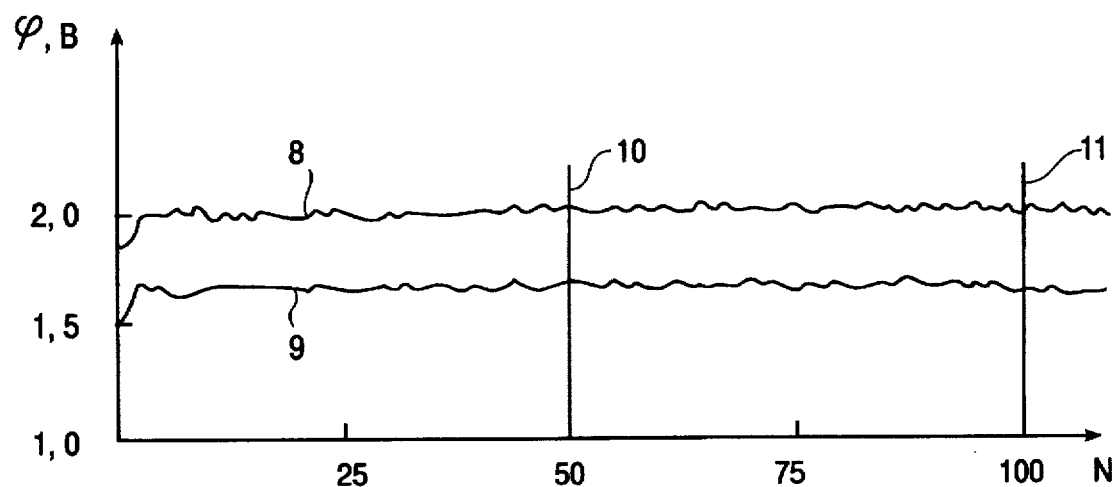
FIG. 4 shows the relationship between the charging/discharging voltage and the number of working cycles for a nickel-zinc cell.

The test results are shown in FIG. 4, in which reference numeral 8 designates a relationship between the final charge potential and the cycle number, 9 designates a relationship between the discharge potential and the cycle number while discharging a 6.0 ampere-hour capacity and 10, 11 designate the control discharge cycles for the 50th and 100th cycles, respectively.

No worsening of the cell parameters was observed in the course of the cycling tests. Current output efficiency was 98%. The control discharge cycles (50th and 100th cycles) showed a capacity value above the nominal level, namely: 42 and 37 ampere-hours, respectively. In the process of the cycling tests, the electrode assemblies were periodically withdrawn from the cell casing for visual inspection. No zinc dendrites were observed. The nickel foil surface was clean, and no zinc traces were found.

A comparison of the discharge parameters of foil-equipped nickel-zinc cells with those of foil-free cells showed that essentially there is no difference between those parameters. This makes it possible to state that the foil makes hardly any contribution to the internal resistance of the cell.

EXAMPLE 2

To confirm the possibility of placing a porous foil in the immediate vicinity of a positive electrode, a nickel-iron cell model was asssembled and tested. The cell comprised a polypropylene casing accomodating an 40 mm ×60 mm iron electrode having a porosity of 60%, two pressed nickel-oxide 40 mm ×60 mm electrodes with a porosity of 70%, and two porous nickel foils having a size of 40 mm ×60 mm, a thickness of 70 μm, a porosity of 40% and an average pore size of 5 μm, these foils adjoining the positive electrodes. The cell casing further comprised a polypropylene separator having a porosity of 60% and a thickness of 1 mm and separating the positive electrodes and the central negative electrode. The total (added-up) capacity of the nickel-oxide electrodes was greater than that of the iron electrode by a factor of 1.7. Use was made of a potassium hydroxide solution having a density of 1.24 g/cm$^3$ as the electrolyte. The cell was charged with a 1 ampere current up to a voltage of 1.3 V. The cell was discharged down to a voltage of 0.9 V. Depending on the value of the discharge current, the capacity output was from 0.6 to 1.0 a:hour. The cell was subjected to cycling tests for several dozens of charge/discharge cycles, but no deterioration of discharge parameters was observed. Comparative tests with a cell having no porous nickel foil showed the foilless cell had similar electric discharge parameters. Data thus obtained make it possible to conclude that the presence of a foil at the positive electrode has practically no adverse effect on the course of electrochemical processes at the electrodes. On the other hand, a foil pressed against the electrode surface acts as a lamella and prevents crumbling and washing-off of the active mass of the electrode. For practical assembly of a cell, a porous foil may be secured to an electrode all along its perimeter, thereby providing a more reliable protection for the electrode and preventing crumbling of its active mass.

EXAMPLE 3

The possibility of making a cell having a porous foil at its negative electrode was confirmed by conducting tests on a nickel-cadmium cell model, in which the foil was placed directly on the cadmium electrode. The cell model was made in the following manner: a standard-type nickel-cadmium cell was dismantled and a porous foil having a thickness of 70 μm, a porosity of 40% and an average pore size of 5 μm, was inserted between the separator and the pressed cadmium electrode. The linear dimensions of the porous nickel foil matched those of the cadmium electrode. The cell was subjected to cycling tests. The cell was charged with a 1.5 ampere current for 8 hours, discharged with the same current down to a final voltage of 1.0 V. The cell displayed discharge parameters that were comparable with those of a standard storage cell. Its current efficiency was as high as 96%. The cell underwent several dozens of test cycles, but no deterioration of its discharge parameters was observed. The test results make it possible to conclude that the presence of a foil at the negative electrode has no effect on the discharge parameters of the cell. Wherein, the introduction of a foil significantly increases the service life of a cell by preventing the active mass from being washed off the cadmium electrode, by impeding the access of oxygen released at the positive electrode during charging to the surface of the cadmium electrode, thereby preventing its passivation. Besides, the porous metallic foil, because of its microporosity and its good wettability, retains an additional amount of electrolyte near the surface of the cadmium electrode which, on the one hand, takes part in the electrochemical process, and, on the other hand, prevents the cadmium electrode from oxidizing by oxygen in the air when the electrolyte is discharged from the cell for subsequent replacement.

Consequently, as transpires from the presented examples, an alkaline storage cell realized in accordance with the present invention features enhanced reliability and stable discharge parameters, without the necessity for more complex construction and without the need for technically complicated operational modes. The experimental data obtained confirms the possibility for practical realization of the alkaline cell with attainment of the abovesaid technical result, which shows that the present invention meets the criterion of industrial applicability.

What is claimed is:

1. An alkaline storage cell comprising a casing, an electrolyte, a positive electrode, a negative electrode, and a multilayer separator interposed between these electrodes, characterized in that said cell further comprises a porous metallic foil inserted between said electrodes.

2. An alkaline storage cell as claimed in claim 1, characterized in that the metallic foil is interposed between the layers of the separator.

3. An alkaline storage cell as claimed in claim 1, characterized in that the porous metallic foil adjoins the positive electrode.

4. An alkaline storage cell as claimed in claim 1, characterized in that the porous metallic foil adjoins the negative electrode.

5. An alkaline storage cell as claimed in claim 1, characterized in that the porous metallic foil has a thickness of from 50 to 200 μm, a porosity of from 30 to 60%, and a pore size of from 1 to 20 μm.

6. An alkaline storage cell as claimed in claim 1, characterized in that the porous metallic foil is made of nickel.

* * * * *